Aug. 14, 1923.
W. F. BROWN
THRASHING MACHINE
Filed March 25, 1921
1,464,863
2 Sheets-Sheet 2
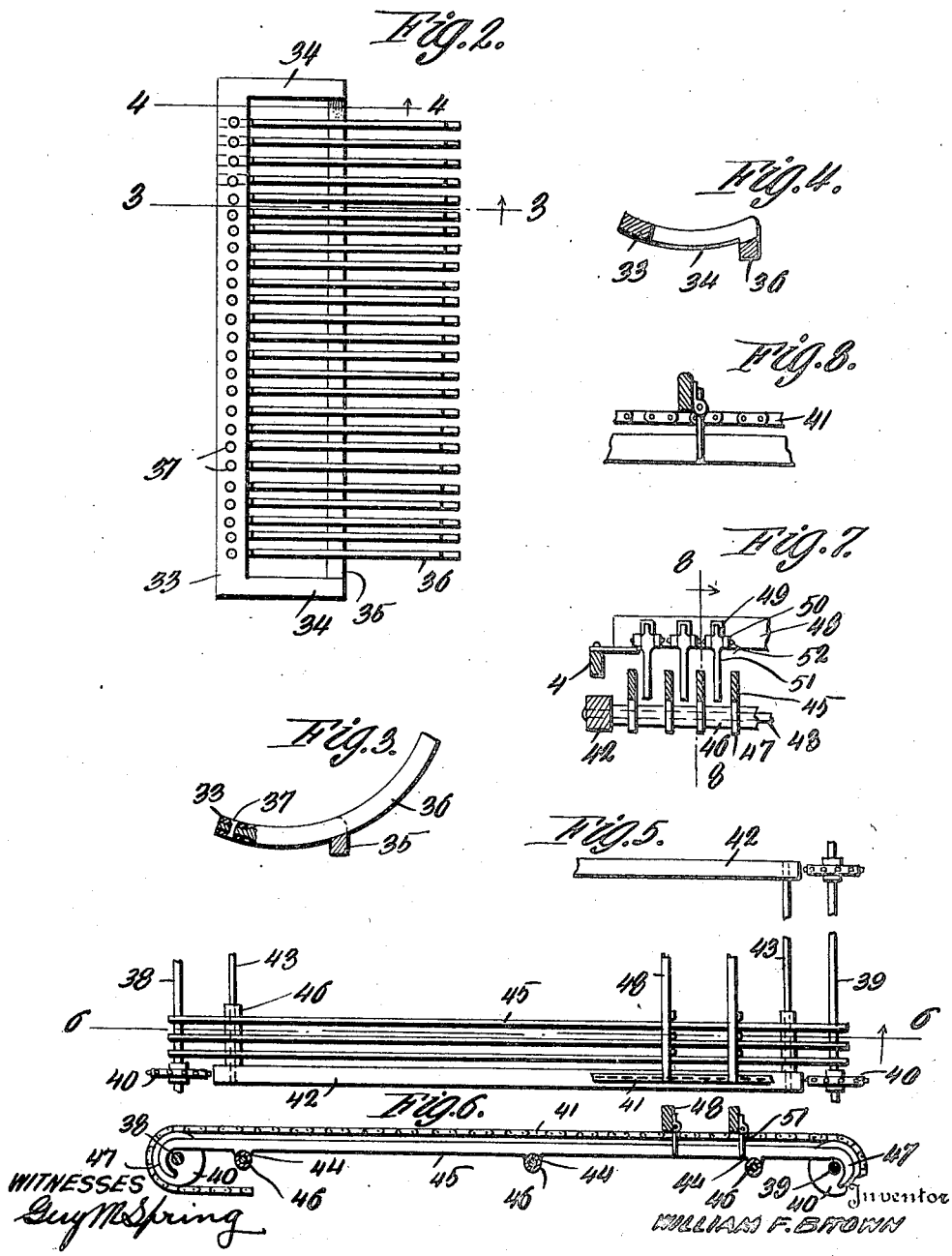

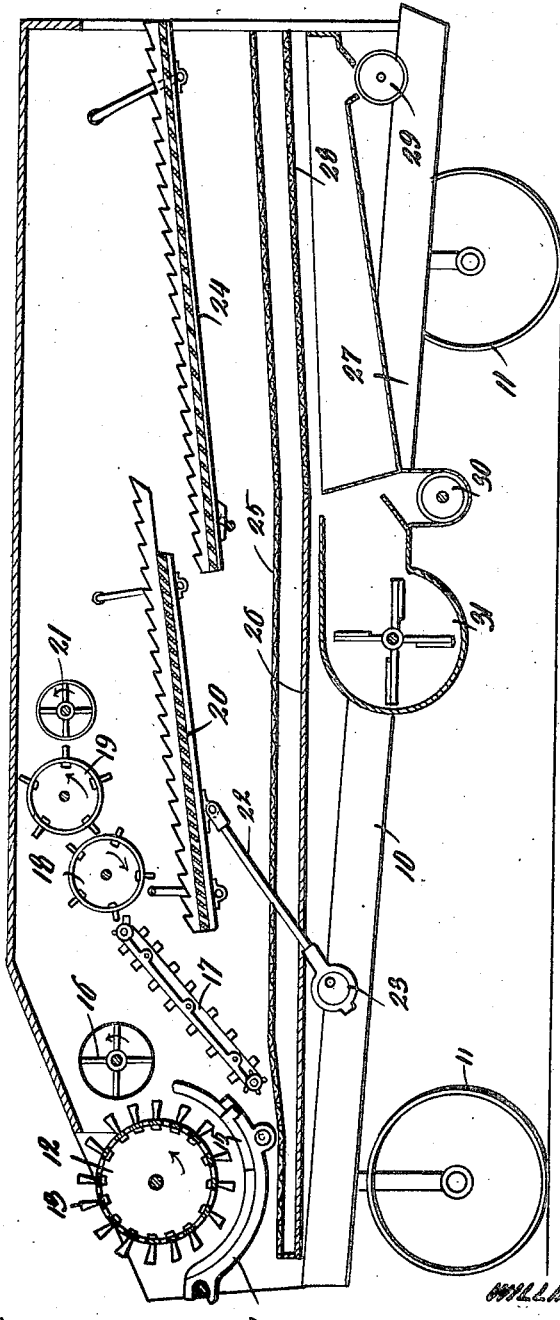

Patented Aug. 14, 1923.

1,464,863

UNITED STATES PATENT OFFICE.

WILLIAM F. BROWN, OF LITTLE ROCK, ARKANSAS, ASSIGNOR OF ONE-HALF TO JOSEPH L. LYONS, OF LITTLE ROCK, ARKANSAS.

THRASHING MACHINE.

Application filed March 25, 1921. Serial No. 455,662.

*To all whom it may concern:*

Be it known that I, WILLIAM F. BROWN, a citizen of the United States, residing at Little Rock, in the county of Pulaski and State of Arkansas, have invented certain new and useful Improvements in a Thrashing Machine, of which the following is a specification.

This invention relates to a thrashing machine and has for its principal object to obtain a more thorough separation of the grain from the straw and especially from wet straw. The thrashing machine is also especially adapted to be used for thrashing rice bundles. Rice bundles often carry mud on them causing chaff and fine trash to collect in most of the openings in the grate under the thrashing cylinders of thrashing machines now commonly in use and it is an object of this invention to obviate this hindrance.

A further object of the invention is to generally improve upon thrashing machines of this character by providing a device which will be of comparatively simple construction, durable and comparatively inexpensive, one which is efficient and reliable in operation and well adapted to the purpose for which it is designed.

With these and numerous other objects in view, the invention resides in certain novel features of construction, and the combination and arrangement of parts as will be hereinafter fully described and claimed.

In the drawing:—

Figure 1 is a longitudinal vertical section taken through the thrashing machine, Figure 2 is a top plan of the grate mechanism used in connection with the concave holder, Figure 3 is a section taken on the line 3—3 of Figure 2 looking in the direction of the arrows, Figure 4 is a section taken on the line 4—4 of Figure 2 looking in the direction of the arrow, Figure 5 is a fragmentary top plan view of the raddle, Figure 6 is a sectional view through the raddle taken on the line 6—6 of Figure 5, Figure 7 is a transverse sectional view taken through the raddle, and Figure 8 is a section taken on the line 8—8 of Figure 7 looking in the direction of the arrow.

Referring to the drawings in detail it will be seen that 10 designates the frame which may be of any preferred construction and is mounted upon the wheels 11 in any preferred manner. Situated in the forward end of the frame 10 is the thrashing cylinder 12 of any conventional construction provided with a plurality of bars having sharpened teeth 13. A concave holder 14 is situated directly under the cylinder 12 and is of the usual design being adjustable at the front and rear in order to raise and lower it. Immediately back of the center in the concave holder 14 there is situated a grate indicated generally by the numeral 15 and the specific construction of this grate will be hereinafter more fully described.

A wing beater 16 is rotatably mounted in the frame 10 to the rear of the cylinder 12 and above its center and will rotate in a like direction with the cylinder 12. As shown in Figure 1 of the drawing this cylinder 12 and the beater 16 will rotate in a counter-clockwise direction. A raddle 17 has its forward end situated below the beater 16 and extends upwardly so that its upper end will terminate on approximately the same level with the beater 16 and so as to be to the rear thereof. The specific construction of this raddle 17 will be hereinafter described. This raddle 17 conveys the straw up to a slow speed cylinder 18 which is rotatably mounted in the frame so as to be situated a little above the upper end of the raddle 17 and to the rear thereof. This slow speed cylinder 18 rotates as shown in Figure 1 in a clockwise direction and will lift the straw from the raddle and carry it into a high speed cylinder 19 which is situated to the rear and above the cylinder 18. This high speed cylinder 19 rotates as shown in Figure 1 in a counter-clockwise direction. The teeth in cylinders 18 and 19 are round and those of cylinder 18 are shorter than those of cylinder 19. The teeth being round do not cut the straw as much as the teeth number 13 but will rethrash any grain left in the straw after passing cylinder number 12 and spread the straw over the racks hereinafter mentioned evenly. A beater 21 is rotatably mounted in the frame 10 to the rear of and on the same level with the cylinder 19 so as to rotate in a like direction therewith. A straw rack 20 is situated below the cylinders 18 and 19 and the beater 21 and is oscillated by means of the rod 22 actuated by the cam 23 or any other suitable manner. A second straw rack 24 is situated to the rear of the rack 20 and is also adapted to oscillate in the frame 10 by any preferred means and these racks 20 and 24 will be of conventional and well known construction.

At the front of the frame 10 starting under cylinder number 12 and extending the entire length of the frame is a chaffer 25. Immediately below the chaffer 25 is positioned a grain pan 26 which also extends from the front end of the frame back to the front of a grain shoe 27. Fastened on the rear end of the grain pan 26 is a second or auxiliary chaffer 28 which extends over the grain shoe 27. This grain shoe 27 is a cleaning shoe of conventional construction. Under the rear end of the grain cleaning shoe there is situated a tailing auger 29 which will also be of conventional construction. Under the front of the grain cleaning shoe 27 there is situated a grain auger 30 and a draft or cleaning fan 31 of the rotary type is situated forwardly of the grain auger 30 so as to deliver its current of air rearwardly.

By referring to Figures 2, 3 and 4 of the drawing the detailed construction of the grate used in connection with the concave holder 14 will be seen. This grate 15 comprises a frame of rectangular construction having a forward bar 33 and side bars 34 extending at right angles from its ends. A rear bar 35 is attached to the side bars 34 and it will be noted that this rear bar 35 is in a different plane from the front bar 33 and side bars 34. These side bars 34 are curved as shown in Figure 4 of the drawing so as to be concentric with the concave holder 14. A plurality of openings are provided in the front bar 33 for receiving the shanks of the grate bars 36. The grate bars have their body portions curved concentric with the concave holder 14 and their intermediate portions rest on the rear bar 35 and are preferably electrically welded thereto. Rivets 37 are driven or inserted through the bar 33 and through the shanks of the grate bars 36. It will be noted that this grate has no cross members to collect wet trash or mud, the force of the straw keeping it clean, therefore it will allow the greater part of the grain to pass therethrough onto the grain pan before it falls upon the straw racks.

The raddle indicated generally by the numeral 17 in Figure 1 is shown in detail in Figures 5, 6, 7 and 8 and it will be seen therefrom that this raddle includes among other parts the forward shaft 38 and rear shaft 39. Each of these shafts 38 and 39 are provided at their ends with sprocket wheels 40 over which pass chains 41. Supporting beams 42 which will be suitably attached to the frame 10 are arranged on each side of the raddle and cross rods 43 extend transversely therebetween so as to pass through bosses 44 formed integral with the grate bars 45. These grate bars 45 are suitably spaced from each other by means of collars 46 and are formed at their ends with hooks 47 which extend around the shafts 38 and 39. There will be enough of these grate bars used to fill the space between the supporting beams 42 and the number thereof will naturally vary in the different sized machines. The spacing can be changed to suit conditions by changing the size or number of the spacing collars 46. Slats 48 extend between the chains 41 and are attached thereto in any suitable manner. A plurality of holders 49 are suitably attached to the slats 48 and are formed with spaced aligned apertured ears 50. Grate cleaning fingers 51 are pivotally mounted intermediate their ends between the ears 50 by means of pins 52. These fingers extend down between the grate bars 45 and are formed of flexible material. On the upward travel of the raddle the fingers extend down and as the raddle slats pass the sprocket wheels 40 and start on the downward travel these fingers will fold down on the under side of the raddle slats.

From the foregoing description, taken in connection with the accompanying drawings, the construction and operation of the thrashing machine will be readily understood without a more extended explanation. As numerous changes in form, proportion, and in the minor details of construction may be resorted to without departing from the spirit of this invention, I do not wish to be limited to the construction herein shown and described other than as claimed.

Having thus described my invention what I claim as new is:—

A grate mechanism of the class described including a substantially rectangular frame comprising a front bar provided with a series of openings extending from its rear side and a second series of openings extending from its upper side, side bars extending rearwardly from the front bar, a rear bar attached to the side bars so as to offset therefrom, a plurality of grate bars having reduced ends extending into the first series of openings in the front bar and having their intermediate portions resting on the rear bar, and rivets in the second series of openings and passing through the reduced ends of the grate bars so as to securely fasten them to the front bar.

In testimony whereof I affix my signature in presence of two witnesses.

WILLIAM F. BROWN.

Witnesses:
 SAMUEL R. LYONS,
 T. E. DICKSON.